(12) United States Patent
Tsou et al.

(10) Patent No.: US 8,122,702 B2
(45) Date of Patent: Feb. 28, 2012

(54) SEALING ARRANGEMENTS FOR GAS TURBINE ENGINE THRUST REVERSER

(75) Inventors: Chi-Ling Michael Tsou, Renton, WA (US); Carl Francis Holdren, Hamilton, OH (US); William Andrew Bailey, Cincinnati, OH (US); Dean Thomas Lenahan, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1083 days.

(21) Appl. No.: 11/870,484

(22) Filed: Oct. 11, 2007

(65) Prior Publication Data

US 2008/0271432 A1 Nov. 6, 2008

Related U.S. Application Data

(63) Continuation-in-part of application No. 11/742,233, filed on Apr. 30, 2007, now Pat. No. 7,966,808.

(51) Int. Cl.
 *F02K 3/02* (2006.01)
(52) U.S. Cl. ........................ 60/226.2; 60/230; 244/129.4
(58) Field of Classification Search .................. 60/226.2, 60/230; 49/475, 495.1; 244/129.4; 277/612, 277/628, 630, 641, 644, 647, 648, 649; 415/201
 See application file for complete search history.

(56) References Cited

U.S. PATENT DOCUMENTS

| | | | |
|---|---|---|---|
| 2,156,681 A * | 5/1939 | Dewhirst et al. ................ 404/65 |
| 3,541,794 A | 11/1970 | Johnston et al. | |
| 3,612,209 A | 10/1971 | Vdoviak et al. | |
| 4,026,105 A | 5/1977 | James | |
| 4,030,291 A | 6/1977 | Sargisson | |
| 4,437,627 A | 3/1984 | Moorehead | |
| 4,533,098 A | 8/1985 | Bonini et al. | |
| 4,538,380 A * | 9/1985 | Colliander ................. 49/475.1 |
| 4,922,712 A | 5/1990 | Matta et al. | |
| 5,046,307 A | 9/1991 | Matta et al. | |
| 5,224,713 A | 7/1993 | Pope | |
| 5,243,817 A | 9/1993 | Matthias | |
| 5,251,435 A | 10/1993 | Pauley | |
| 5,281,090 A | 1/1994 | Starling | |
| 5,315,821 A | 5/1994 | Dunbar et al. | |
| 5,655,360 A | 8/1997 | Butler | |
| 5,890,873 A | 4/1999 | Willey | |
| 5,915,697 A | 6/1999 | Bagepalli et al. | |
| 5,927,647 A | 7/1999 | Masters et al. | |
| 6,026,638 A | 2/2000 | Gonidec et al. | |
| 6,065,756 A | 5/2000 | Eignor | |
| 6,394,459 B1 | 5/2002 | Florin | |
| 6,592,074 B2 | 7/2003 | Dehu et al. | |
| 6,659,472 B2 | 12/2003 | Aksit et al. | |
| 6,984,106 B2 | 1/2006 | Thompson | |
| 7,338,253 B2 | 3/2008 | Nigmatulin | |
| 7,604,241 B2 | 10/2009 | Kowalczyk | |
| 2005/0229584 A1 * | 10/2005 | Tweedie et al. .............. 60/226.1 |

* cited by examiner

*Primary Examiner* — Louis Casaregola
(74) *Attorney, Agent, or Firm* — David J. Clement, Esq.; Trego, Hines & Ladenheim, PLLC

(57) ABSTRACT

A transcowl for a gas turbine engine thrust reverser includes an arcuate outer wall; an arcuate inner wall; and an arcuate baffle positioned between the inner and outer walls at a forward end of the transcowl. The baffle has an arcuate cross-sectional shape which defines a forward-facing interior area. An arcuate forward seal is carried at a forward end of the inner wall. The forward seal includes a plurality of axially-extending, spaced-apart arcuate seal teeth which collectively define a labyrinth seal.

11 Claims, 16 Drawing Sheets

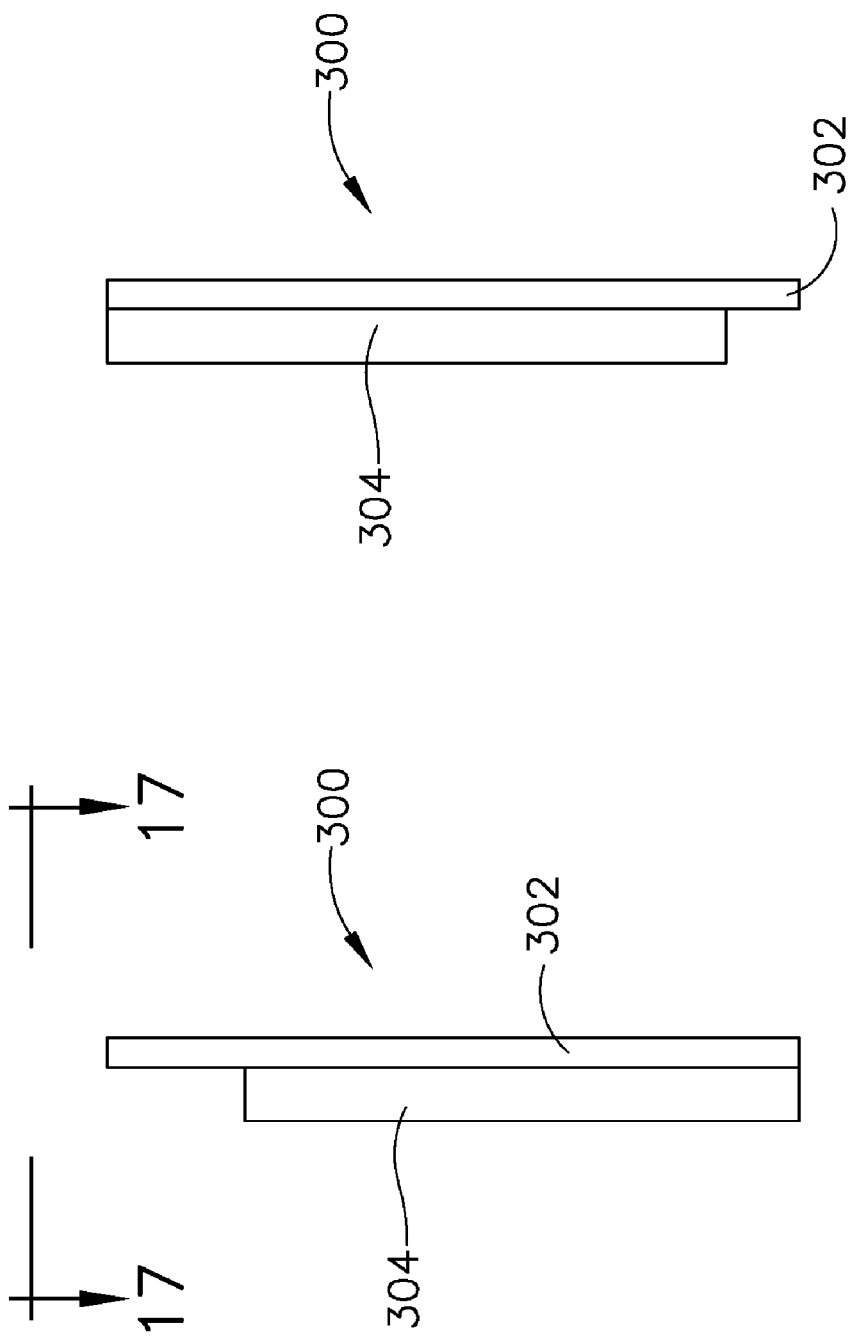

SEALING ARRANGEMENTS FOR GAS TURBINE ENGINE THRUST REVERSER

CROSS-REFERENCE TO RELATED APPLICATIONS

This application is a Continuation-In-Part of application Ser. No. 11/742,233, Filed Apr. 30, 2007.

BACKGROUND OF THE INVENTION

This invention relates generally to gas turbine engine thrust reversers and more particularly to air seals for such reversers.

A gas turbine engine includes a turbomachinery core having a high pressure compressor, combustor, and high pressure turbine in serial flow relationship. The core is operable in a known manner to generate a primary flow of propulsive gas. A typical turbofan engine adds a low pressure turbine driven by the core exhaust gases which in turn drives a fan through a shaft to generate a bypass flow of propulsive gas. In the case of a high bypass engine this provides the majority of the total engine thrust.

Aircraft turbofan engines typically employ thrust reversers for ground deceleration. Known designs include "target" reversers, blocker-door reversers, and "doorless" reversers. Thrust reversers may be provided for the primary or bypass flows of an engine, or both. Each type of thrust reverser includes one or more components which are selectively moveable from a stowed position in which they do not affect engine thrust, to a deployed position in which some portion of the engine's thrust is turned or directed forward in order to slow the aircraft.

Thrust reverser components are relatively large and subject to air loads, vibration, thermal gradients, and other varying loads in operation. Accordingly, there is a limit to how small gaps and tolerances can be made, and some leakage of fan bypass flow occurs from the bypass duct to secondary flowpaths (i.e. inside the reverser). This results in a mixing pressure loss in the bypass duct that reduces net thrust, thus undesirably increasing specific fuel consumption (SFC).

BRIEF SUMMARY OF THE INVENTION

These and other shortcomings of the prior art are addressed by the present invention, which provides a thrust reverser seal arrangement that reduces unwanted leakage of air flow, thus improving SFC of the engine.

According to one aspect, the invention provides a transcowl for a gas turbine engine thrust reverser, including: an arcuate outer wall; an arcuate inner wall; and an arcuate baffle disposed between the inner and outer walls at a forward end of the transcowl, the baffle having an arcuate cross-sectional shape which defines a forward-facing interior area. An arcuate forward seal is carried at a forward end of the inner wall. The forward seal includes a plurality of axially-extending, radially spaced-apart arcuate seal teeth which collectively define a labyrinth seal.

According to another aspect of the invention a transcowl for a gas turbine engine thrust reverser includes: an arcuate outer wall; an arcuate inner wall; and an arcuate baffle disposed between the inner and outer walls at a forward end of the transcowl, the baffle having an arcuate cross-sectional shape which defines a forward-facing interior area. At least one restrictor is disposed in the interior area so as to block air movement in a circumferential direction within the interior area According to another aspect of the invention, a forward seal for a transcowl of a gas turbine engine includes: an arcuate mounting flange adapted to be mounted to an arcuate inner wall of the transcowl, the mounting flange including at least one arcuate seal tooth extending axially therefrom; and a radial arm extending outwardly from the mounting flange, the radial arm having at least one arcuate seal tooth extending axially from a forward face thereof. The seal teeth collectively form a labyrinth seal.

BRIEF DESCRIPTION OF THE DRAWINGS

The invention may be best understood by reference to the following description taken in conjunction with the accompanying drawing figures in which:

FIG. 16 is a front view of the restrictor of FIG. 15; and

FIG. 17 is a view taken along lines 17-17 of FIG. 16.

DETAILED DESCRIPTION OF THE INVENTION

Figure 1:
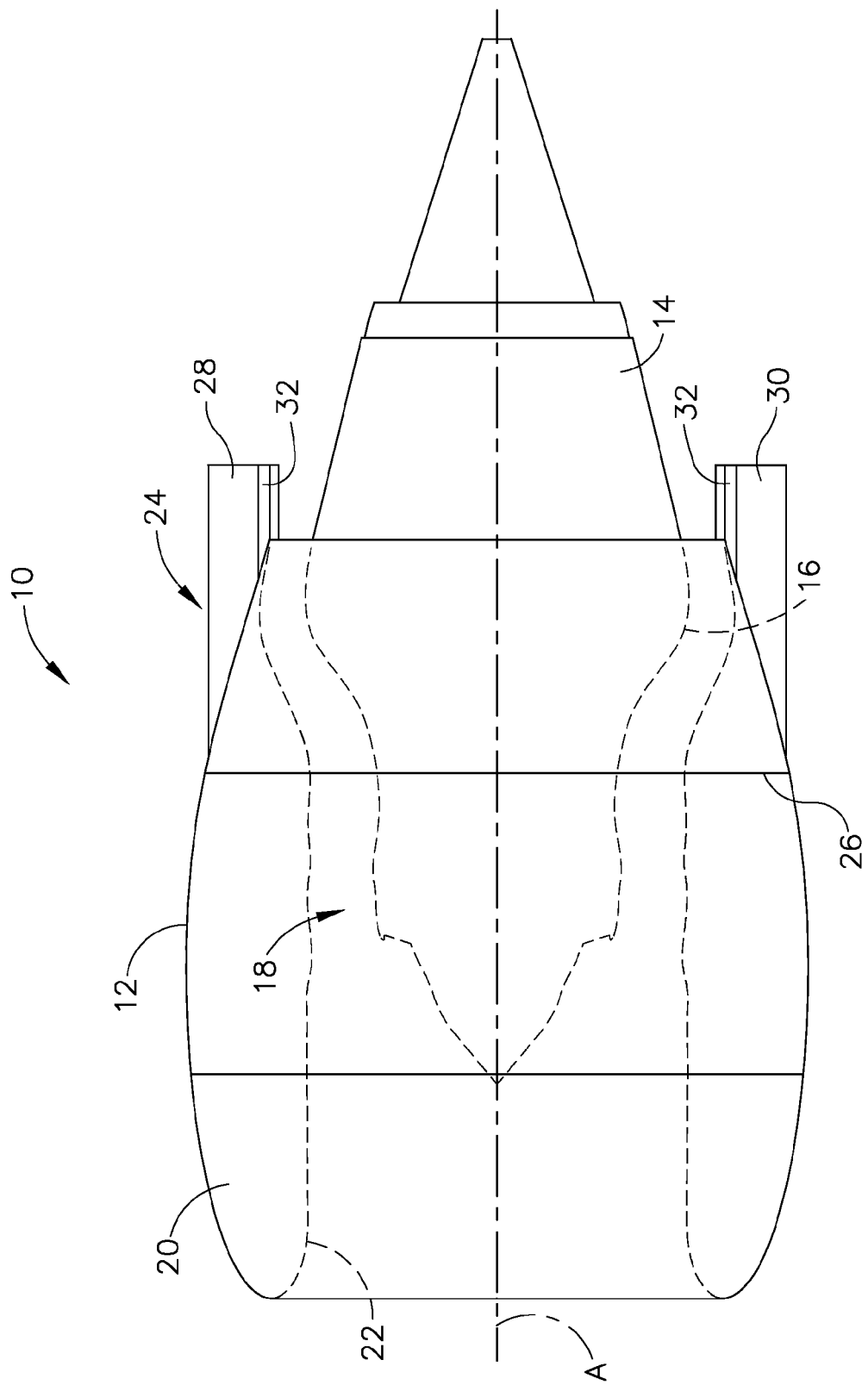
FIG. 1 is a schematic side view of a gas turbine engine incorporating a thrust reverser constructed according to an aspect of the present invention.

Referring to the drawings wherein identical reference numerals denote the same elements throughout the various views, FIG. 1 depicts an aircraft turbofan engine 10. The engine 10 has a longitudinal axis "A". The engine 10 is enclosed in a nacelle 12 and a casing or core nacelle 14 which defines an inner flowpath 16 of a bypass duct 18. A fan nacelle 20 cooperates with the nacelle 12 to define the outer flowpath 22 of the bypass duct 18.

While not illustrated, it will be understood that the nacelle 12 encloses conventional components including a fan, a low pressure compressor or "booster" and a low pressure turbine ("LPT"), collectively referred to as a "low pressure system", and a high pressure compressor ("HPC"), a combustor, and a high pressure turbine ("HPT"), collectively referred to as a "gas generator" or "core". Together, the high and low pressure systems are operable in a known manner to generate a primary or core flow as well as a fan flow or bypass flow. The present invention is described and illustrated in the context of a high-bypass turbofan engine. However, the principles described herein are equally applicable to fan reversers for low-bypass engines, to turbine reversers, or to turbojet engines.

The engine 10 includes a thrust reverser 24 of the type having a pair of opposed, generally semicircular cowlings referred to as "transcowls" 26. In the illustrated example, the reverser includes "left" and "right" transcowls. Only the left transcowl 26 is shown in FIG. 1, it being understood that the right transcowl 26 is generally a mirror image thereof. The present invention is equally applicable to other configurations which may use transcowls positioned in a different orientation (e.g. upper and lower), or a single larger transcowl. The transcowls 26 are supported at their terminal ends by spaced-apart upper and lower beams 28 and 30, respectively, via rails or tracks 32, so that the transcowls 26 can translate forward and aft in a direction generally parallel to axis A, powered by a known type of actuator (not shown). As with prior art thrust reversers, the reverser halves may be mounted so that they can swing open about a longitudinal axis for inspection or servicing. Accordingly, the upper beam 28 may also be referred to as a "hinge beam" and the lower beam 30 may be referred to as a "latch beam".

Figure 2:
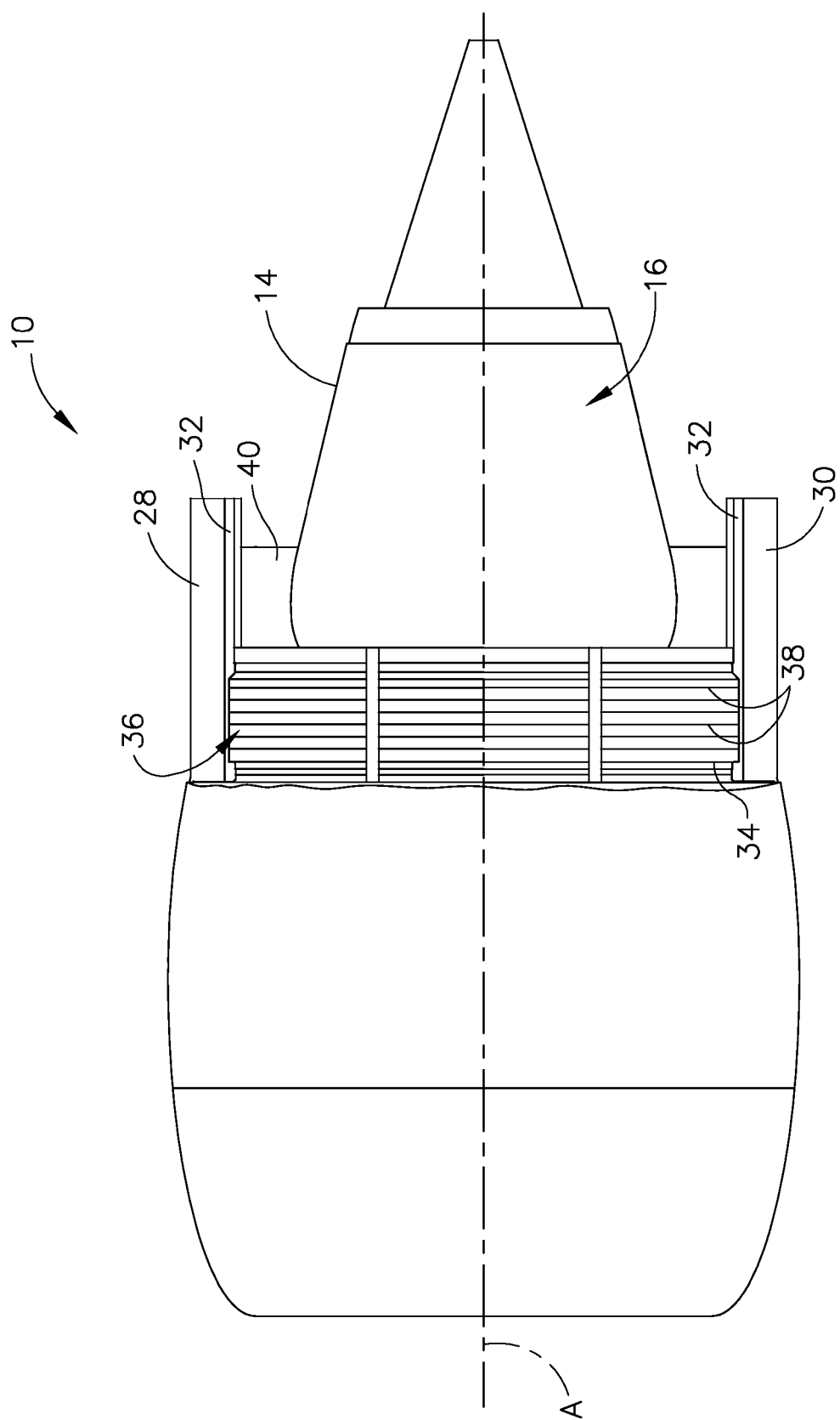
FIG. 2 is schematic side view of the gas turbine engine of FIG. 1, with a transcowl thereof removed to show the internal components of the thrust reverser.

FIG. 2 shows the engine 10 with the left hand transcowl 26 removed to expose the internal components of the thrust reverser 24. A semicircular torque box 34 supports and connects upper and lower beams 28 and 30. A semicircular assembly of cascade boxes 36 containing reversing vanes 38 extends from the upper beam 28 to the lower beam 30 and is structurally attached to the upper and lower beams 28 and 30 and to the torque box 34. Another torque box and cascade boxes (not shown) are carried on the opposite, right, side of the engine 10. An inner reverser fairing 40 cooperates with the core nacelle 14 to form a part of the bypass duct inner flowpath 16.

Figure 3:
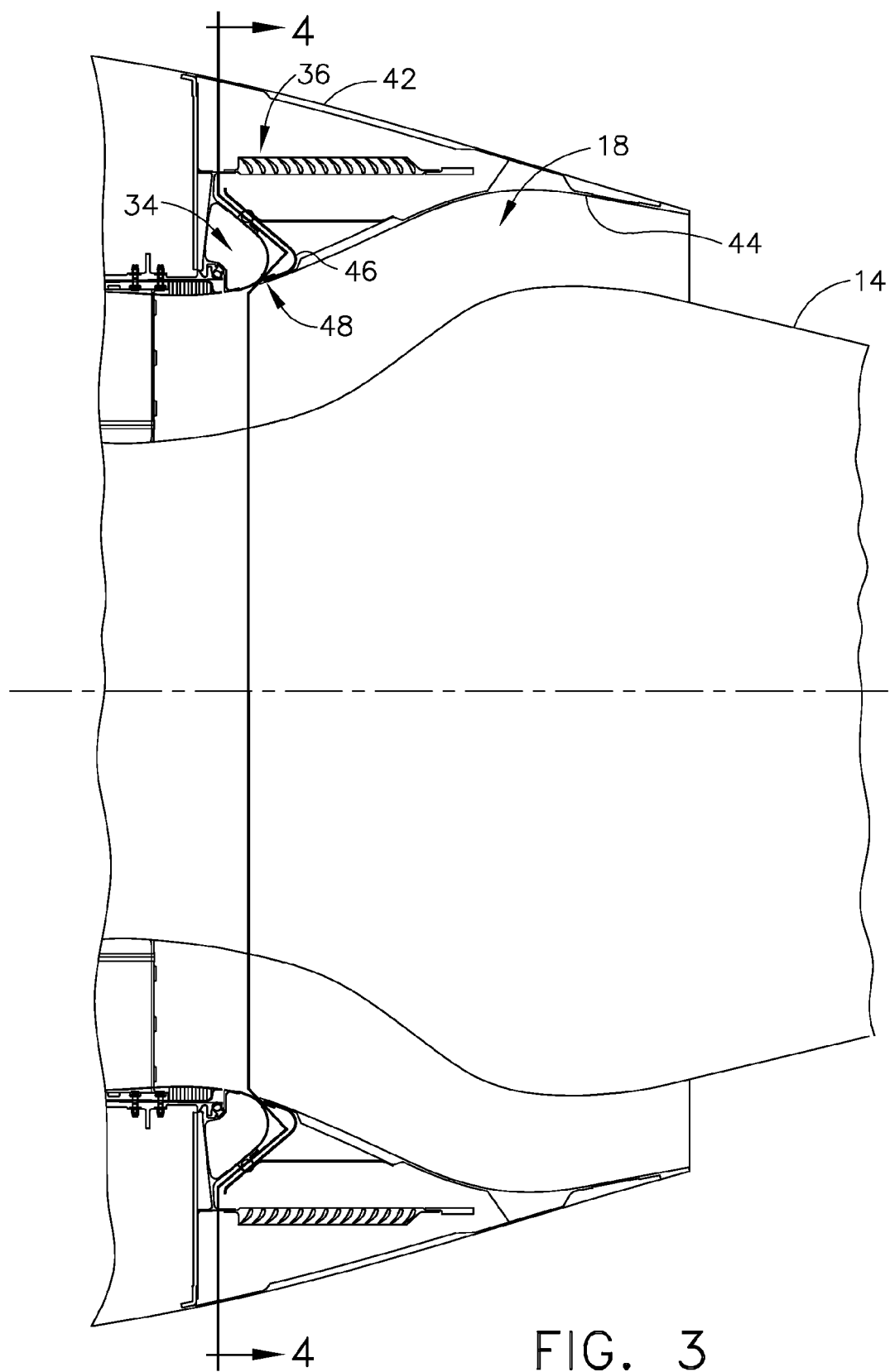
FIG. 3 is a schematic cross-sectional view of the thrust reverser of the gas turbine engine shown in FIG. 1.

FIG. 3 shows in more detail the cross-section of the thrust reverser 24 in a forward-most or "stowed" position. The transcowl 26 includes an outer wall 42, an inner wall 44 which forms a part of the outer flowpath 22, and a forward-facing baffle 46 having an arcuate cross-section. A forward seal 48 is carried by the forward end 49 of the inner wall 44, near the radially inner end of the baffle 46. The forward seal 48 rides in close proximity to the aft end of the torque box 34.

For various reasons it is impractical to make a complete seal between the torque box 34 and the baffle 46 using the forward seal 48. Accordingly, there exists an open leakage path which allows air to flow from the bypass duct 18 through the forward seal 48 in a generally radially outward direction into the space between the torque box 34 and the baffle 46, then circumferentially around to the upper beam 28 and the lower beam 30, and then longitudinally aft back into the bypass duct 18. Diversion of the fan flow through this leakage path results in a mixing pressure loss which reduces net thrust of the engine 10, which in turn increases SFC.

Figure 4:
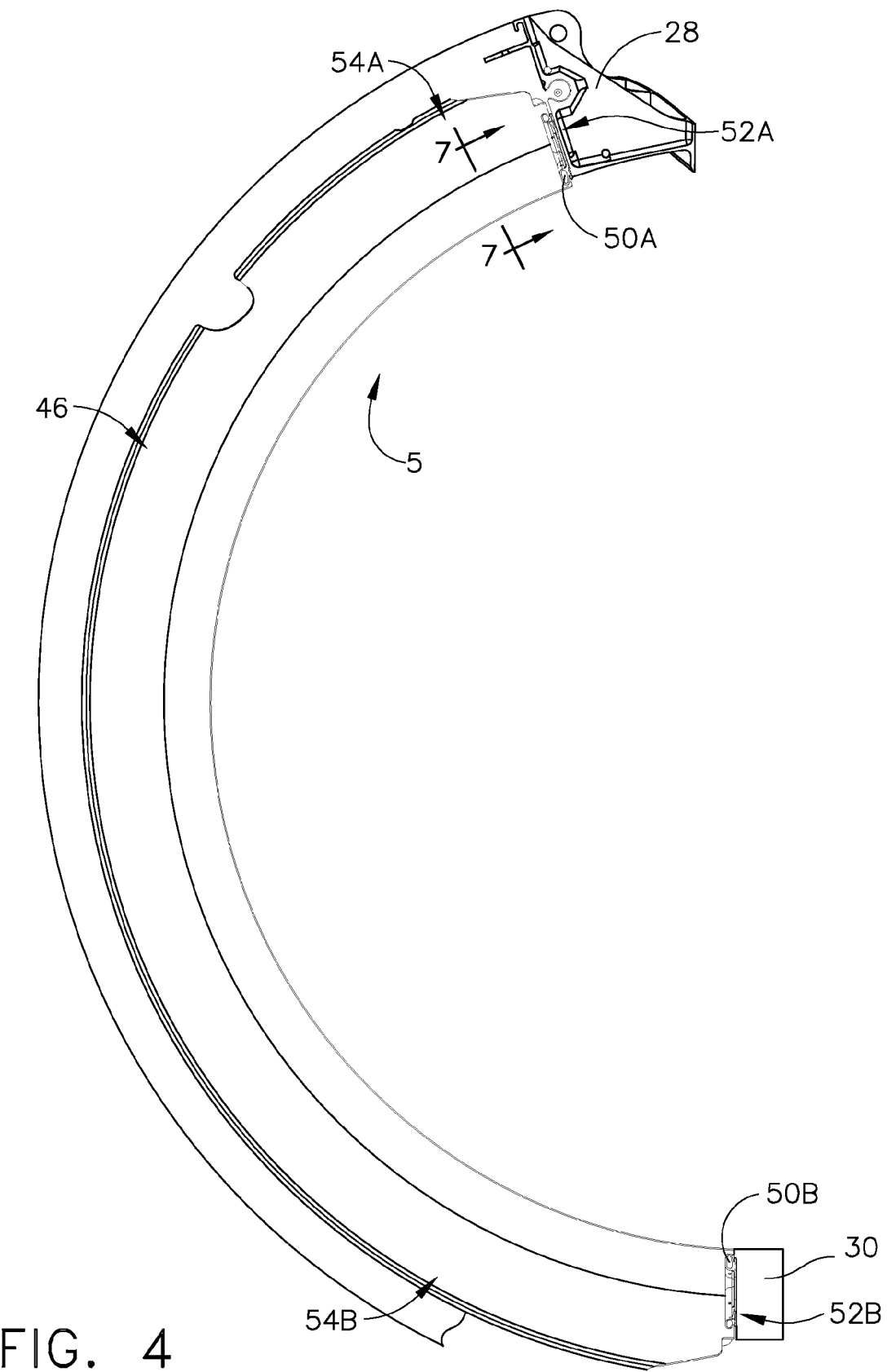
FIG. 4 is a view taken along lines 4-4 of FIG. 3.

To reduce or prevent this leakage, one or more baffle seals 50 are provided, as shown in FIG. 4, which is a forward-looking aft (FLA) view. Upper and lower baffle seals 50A and 50B are attached to the side faces 52A and 52B of the upper and lower beams 28 and 30, respectively, in alignment with the upper and lower ends 54A and 54B of the baffle 46. Only the right-side (i.e. aircraft starboard side) baffle seals 50 are shown in FIG. 4, with the understanding that another pair of baffle seals 50 would be installed on the left-side (i.e. aircraft port) faces of the upper and lower beams 28 and 30.

Figure 5:
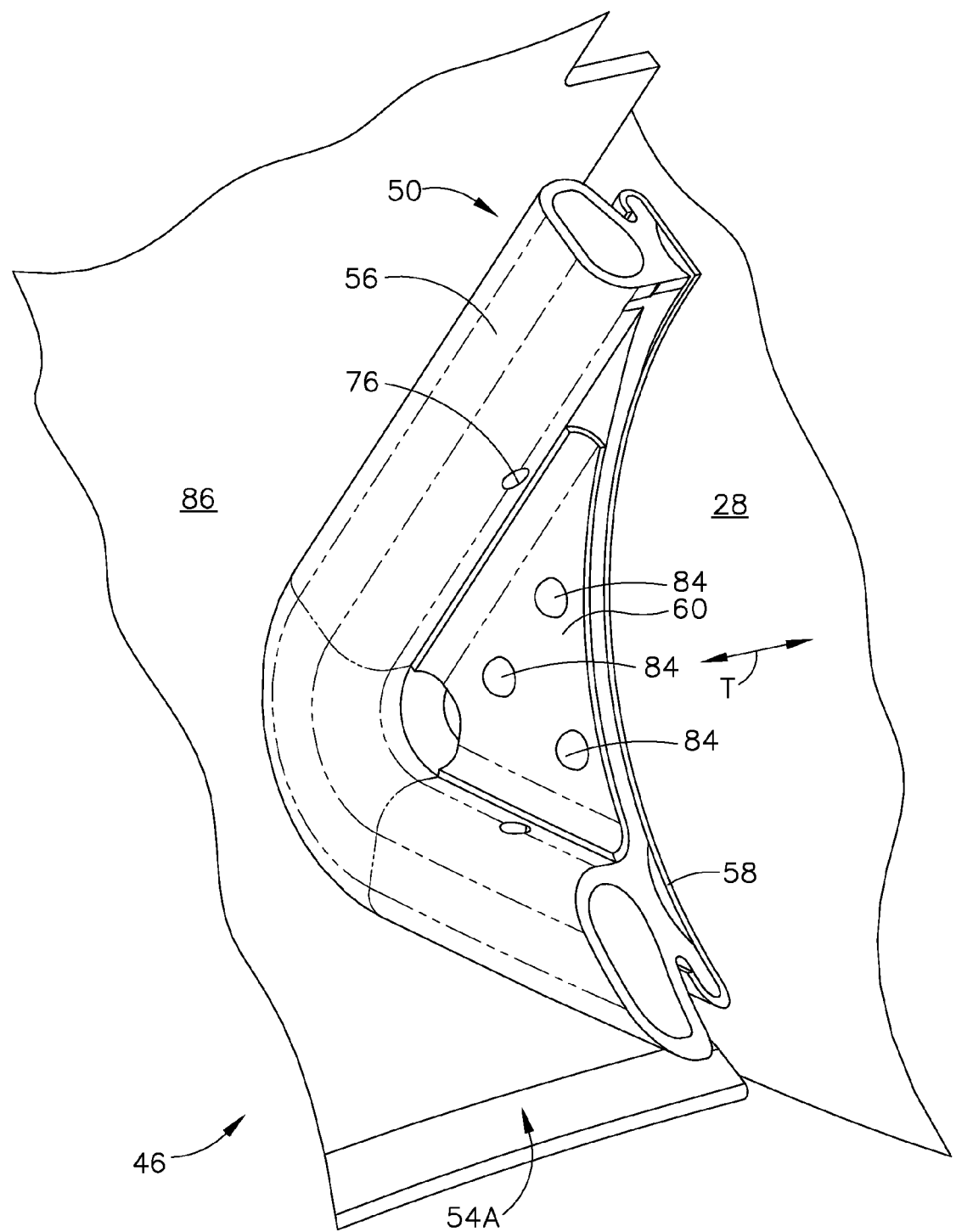
FIG. 5 is a perspective view of a baffle seal of the thrust reverser.
Figure 6:
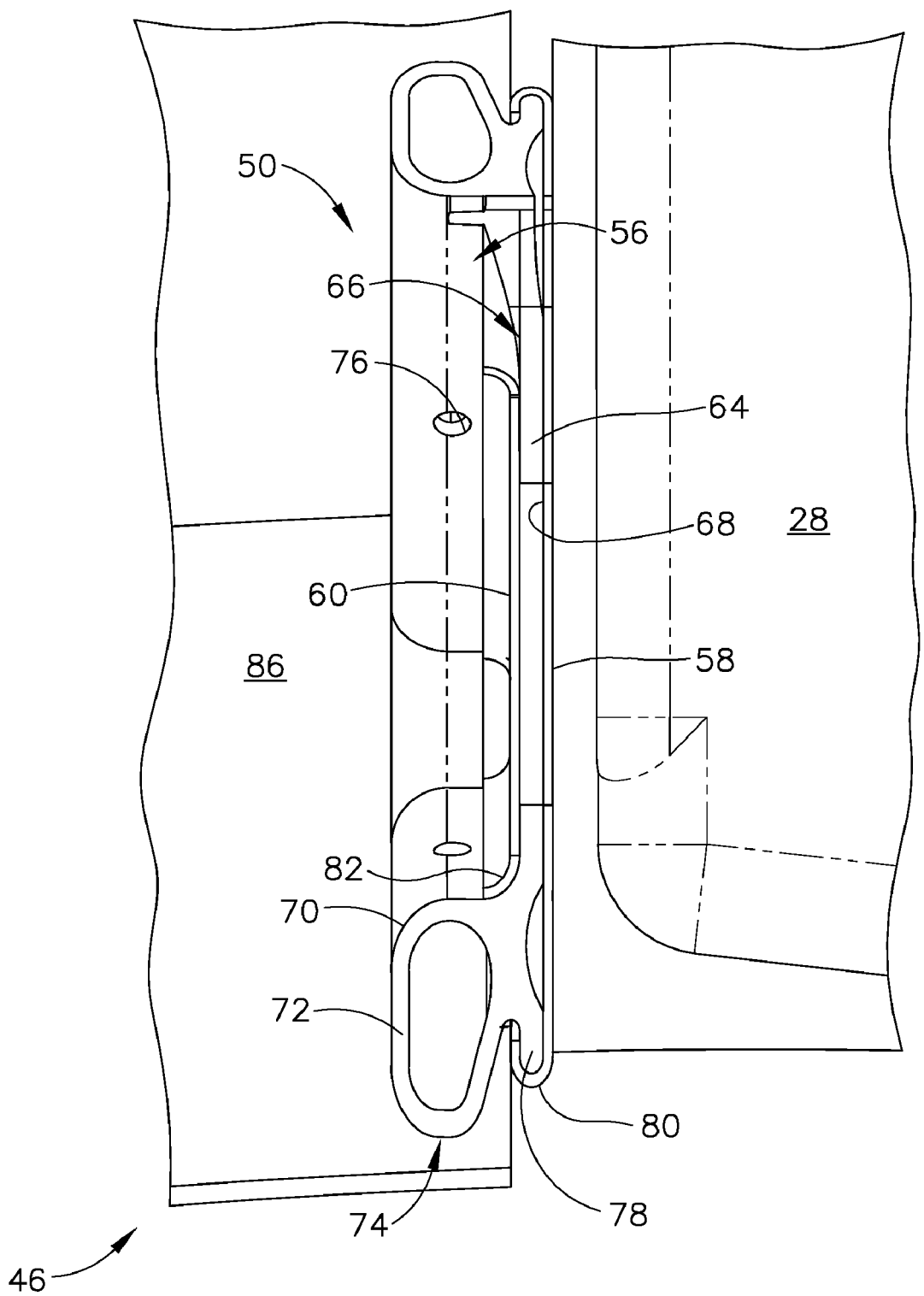
FIG. 6 is a front view of the baffle seal of FIG. 5.
Figure 7:
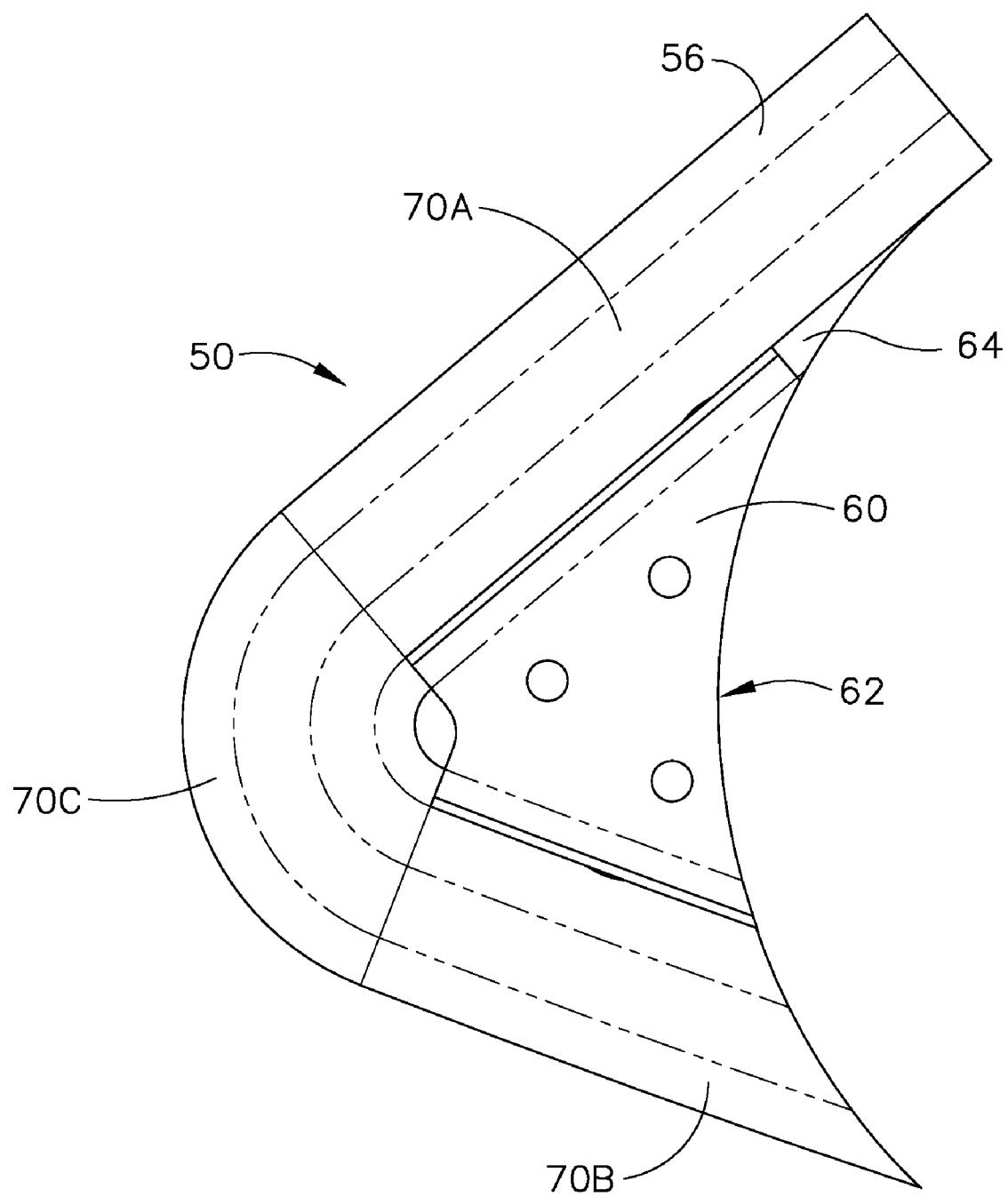
FIG. 7 is a side view of the baffle seal of FIG. 5.

FIGS. 5-7 illustrate a baffle seal 50 in more detail. The specific baffle seal 50 illustrated is the upper right-hand unit, which is identical to a lower left-hand unit (not shown). In this example, the upper left-hand and lower right-hand baffle seals 50 would have mirror-image configurations to that of the illustrated baffle seal 50, but otherwise the baffle seal 50 is representative of all of the baffle seals 50.

Each baffle seal 50 comprises a seal body 56, optionally provided with a backing plate 58 and a retainer 60. The seal body 56 is generally three-sided in plan view with an arcuate forward edge 62 contoured to the shape of the torque box 34. The seal body 56 may be generally triangular or may have more of a "D"-shape in plan view, depending on the particular application. The seal body 56 has a relatively flat central portion 64 with opposed front and back sides 66 and 68. The aft side of the seal body 56 is formed into a hollow tube-like sealing rim 70 formed by a closed wall 72, which in this case has an elongated cross-section with rounded ends. Other cross-sectional shapes may be used as well. For example, instead of a tube-like geometry, the sealing rim 70 may be a flange or "flapper" shape. The outer periphery of the sealing rim 70 defines a sealing surface 74 which extends beyond the outer periphery of the central portion. The sealing rim 70 is generally V- or C-shaped with elongated legs 70A and 70B connected at their proximal ends by a curved segment 70C. When installed, the distal ends of the legs 70A and 70B butt up against other components of the thrust reverser 24 and may be closed off with a sealant, such as room-temperature vulcanizing (RTV) silicone. At least one vent opening 76 is formed in the sealing rim 70 to allow it to equalize its internal pressure with the ambient pressure (e.g. when atmospheric pressure changes during flight, or when the sealing rim 70 is compressed during stowage of the transcowl 26). A portion of the periphery of the seal body 56 extends outwardly from the central portion 64 to form an edge bead 78.

The seal body 56 is formed from a resilient material such as silicone rubber. The outer surface of the baffle seal 50 may be covered with a flexible, abrasion-resistant material to avoid damage from rubbing. One example of a suitable material is DACRON polyester fabric.

The backing plate 58 is made of a relatively rigid material such as aluminum sheet. It is generally triangular in plan view with an arcuate forward edge and has a curved lip 80 formed around its periphery (or a portion thereof) which serves to receive the edge bead 78 of the baffle seal 50.

The retainer 60 is also made of a relatively rigid material such as aluminum sheet. It is generally triangular in plan view with an arcuate forward edge. It has flanges 82 formed along its upper and lower edges which bear against the inside surfaces of the baffle seal 50, near the junction between central portion 64 and the sealing rim 70.

In the illustrated example the baffle seal 50 is secured to the upper beam 28 with rivets 84 extending through the retainer 60, baffle seal 50, backing plate 58, and the upper beam 28. However it will be understood that the baffle seal 50 could be attached with other types of fasteners (e.g. bolts, machine screws), or by methods such as welding or adhesives. The backing plate 58 restrains the outer periphery of the seal body 56 against the upper beam 28 so as to avoid "dishing" or curling. The seal body 56 is further restrained in the desired shape by the retainer, which presses the sealing surface 74 into place as well as spreading out the load of the metallic rivets 84 to hold the seal body 56 in place without tearing.

When the transcowl 26 is stowed, as shown in FIGS. 5 and 6, the interior surface 86 of the baffle 46 engages the baffle seal 50. Because the transcowl 26 moves in the direction of the arrow "T" when being stowed or deployed, the interaction with the baffle seal 50 is a combination of sliding and compression. This minimizes any loads placed on the actuating equipment by the presence of the baffle seal 50.

In operation, flow in the bypass duct 18 will initially tend to leak past the forward seal 48 as with a prior art thrust reverser and will flow circumferentially inside the leak path. However, the air is blocked or substantially prevented from exiting the leak path by the baffle seal 50. This tends to cause the pressure to equalize between the leak path and the bypass duct 18. Without a substantial pressure differential to drive flow into the leak path, further leakage is greatly reduced. It is estimated that this leakage reduction can improve SFC by about 0.05% in certain applications.

Figure 8:
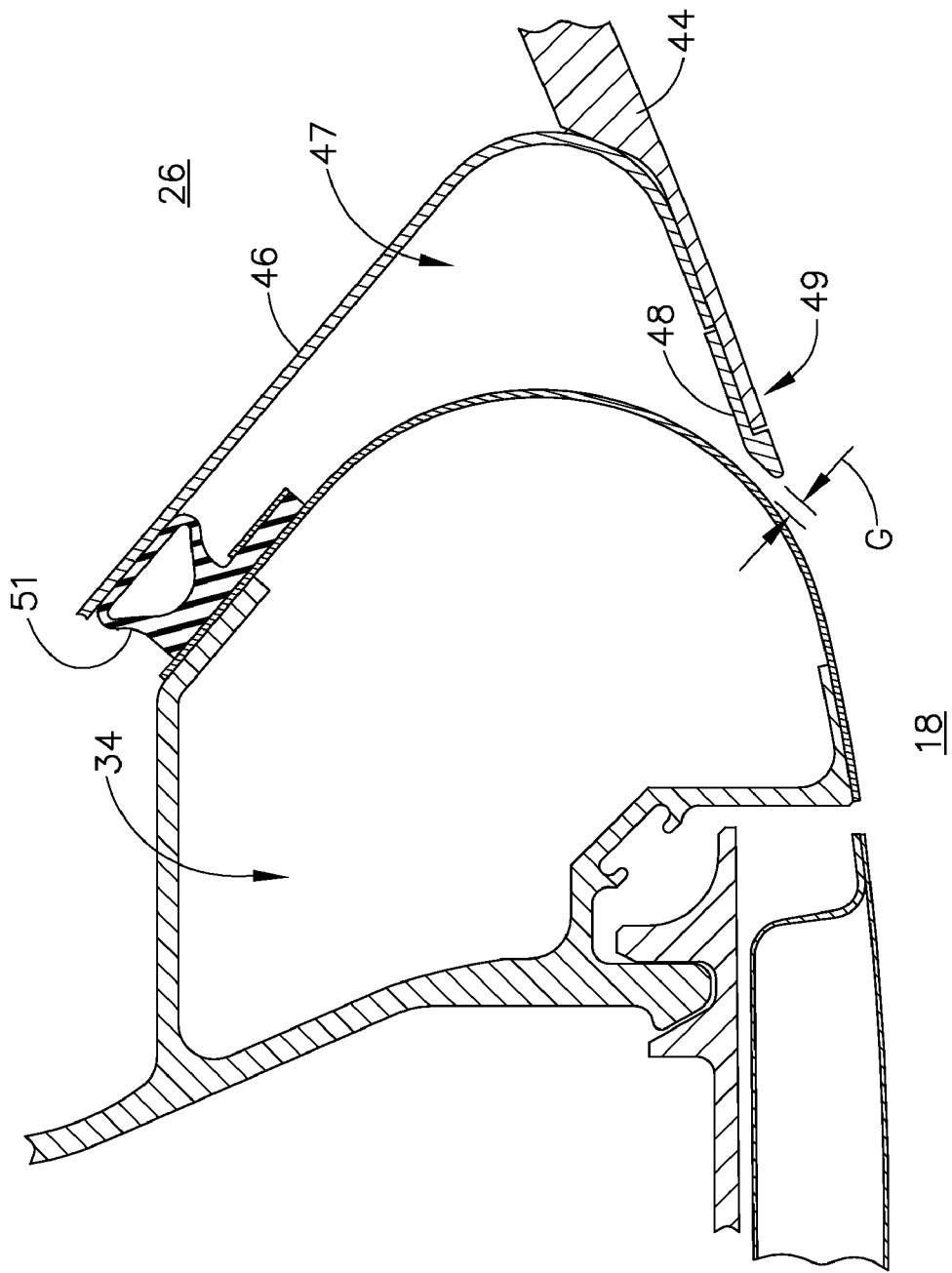
FIG. 8 is a cross-sectional view of a portion of the thrust reverser shown in FIG. 3, showing a prior art forward seal.

FIG. 8 illustrates a portion of the transcowl 26, including the baffle 46 and the inner wall 44, in a stowed position adjacent the torque box 34. A prior art forward seal 48 is carried at the forward end 49 of the inner wall 44 and rides in close proximity to the torque box 34 when the transcowl 26 is stowed. The arcuate cross-section of the baffle 46 defines an interior area or space 47. A gap "G", typically about 2.5 mm (0.1 in.) is present between the forward seal 48 and the torque box 34. This gap G permits leakage from the fan bypass duct 18 as described above. In order to reduce the gap G, or to effect a completely gapless seal, the forward seal 48 would have to be flexible to allow it to compress without distorting or damaging the transcowl 26 or torque box 34. The conventional aerostow seal 51 is shown being compressed in this manner. However, the forward seal 48 is also subject to substantial air loads in the deployed position, and it must be somewhat rigid to resist those loads.

Figure 9:
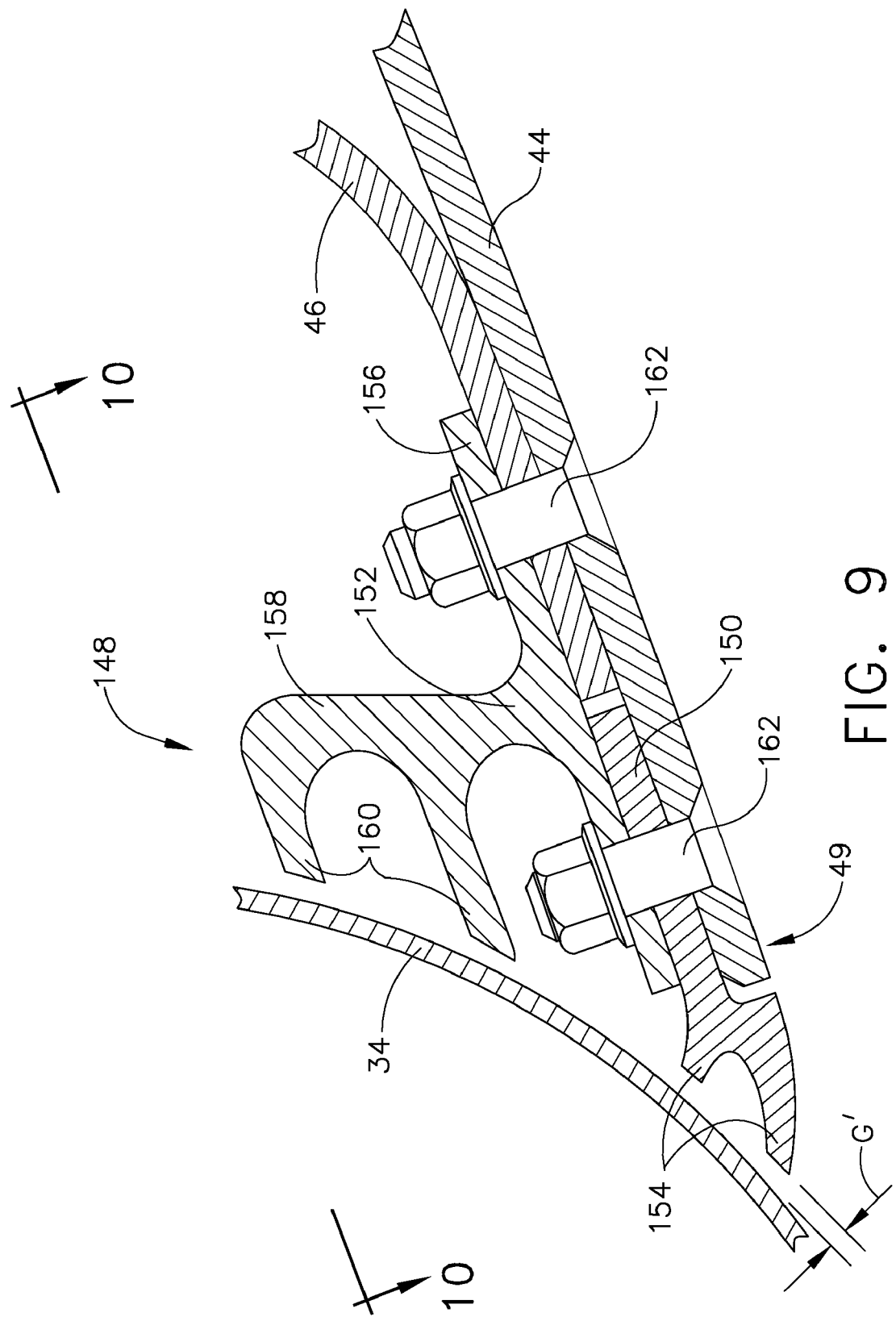
FIG. 9 is a cross-sectional view of a forward seal constructed according to one aspect of the present invention.
Figure 10:
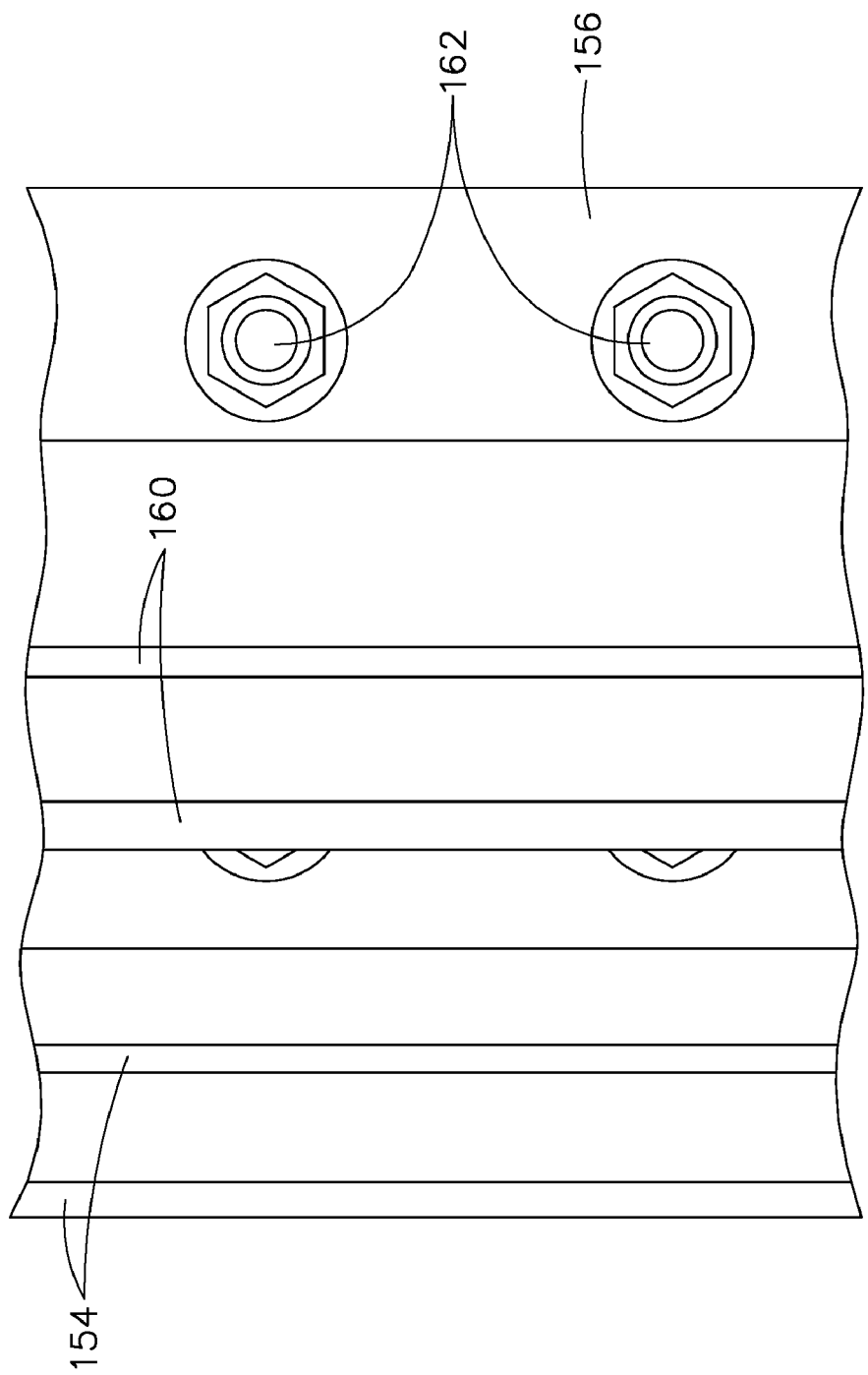
FIG. 10 is a view taken along lines 10-10 of FIG. 9.
Figure 11:
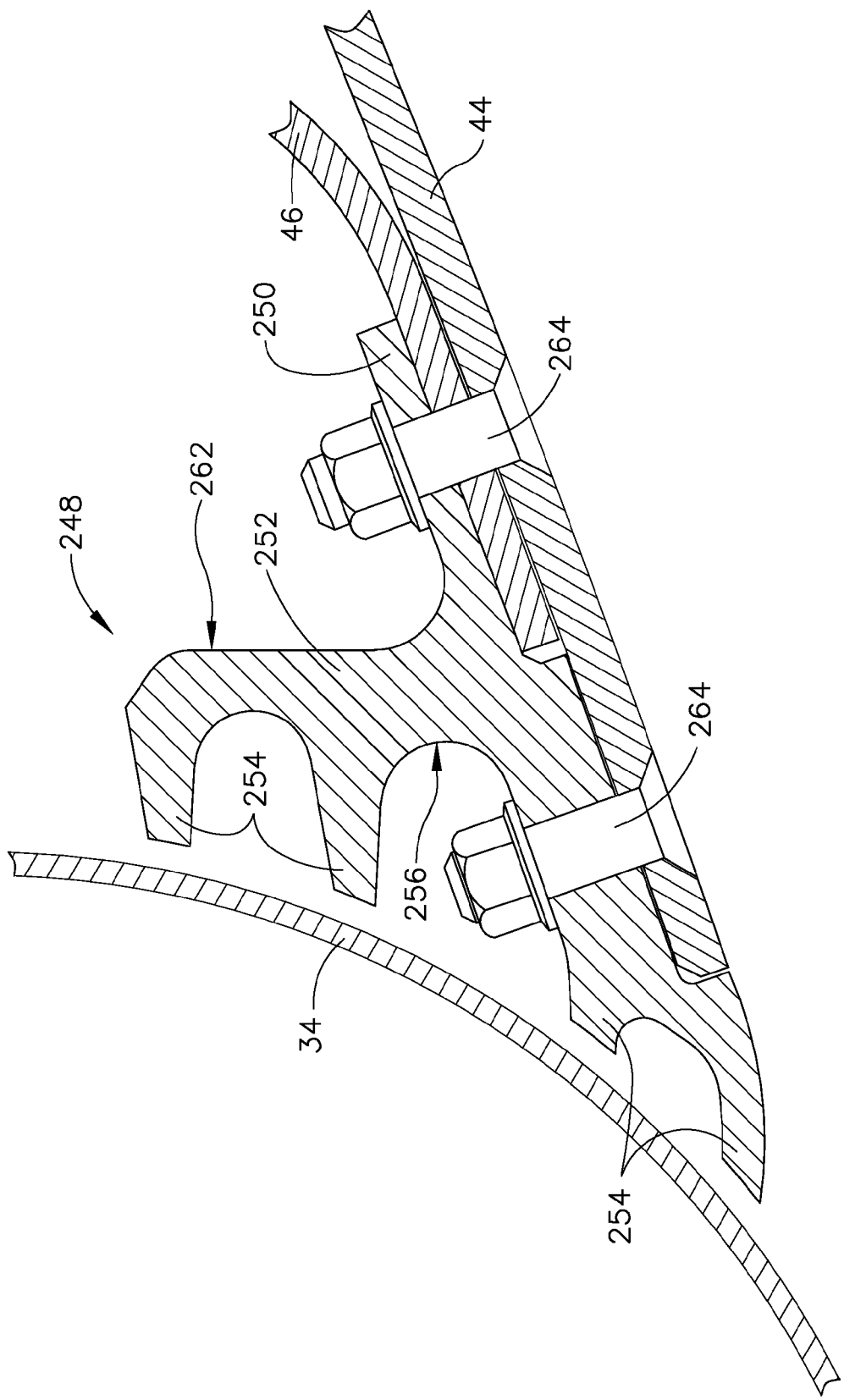
FIG. 11 is a cross-sectional view of an alternative forward seal constructed according to another aspect of the present invention.
Figure 12:
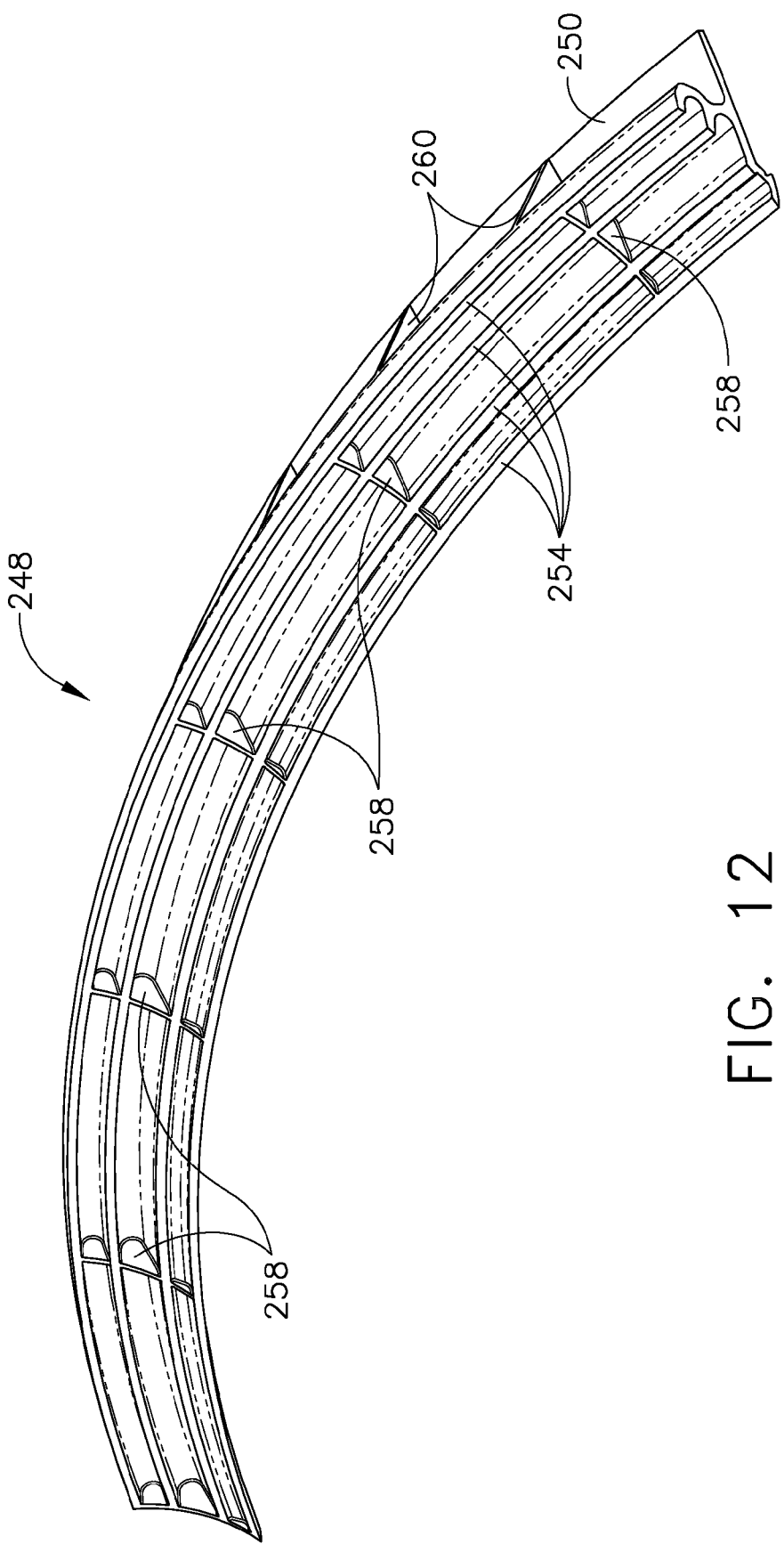
FIG. 12 is front perspective view of the forward seal of FIG. 11.
Figure 13:
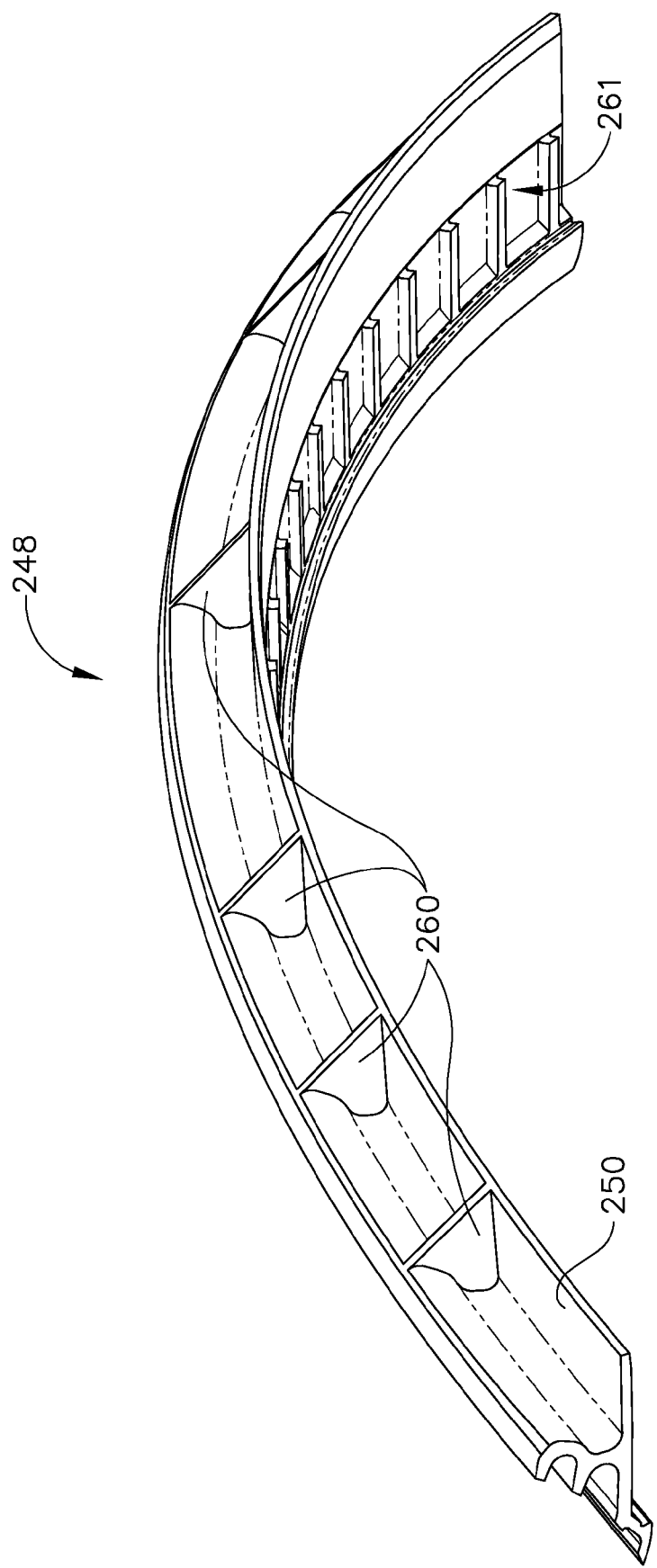
FIG. 13 is a rear perspective view of the forward seal of FIG. 11.
Figure 14:
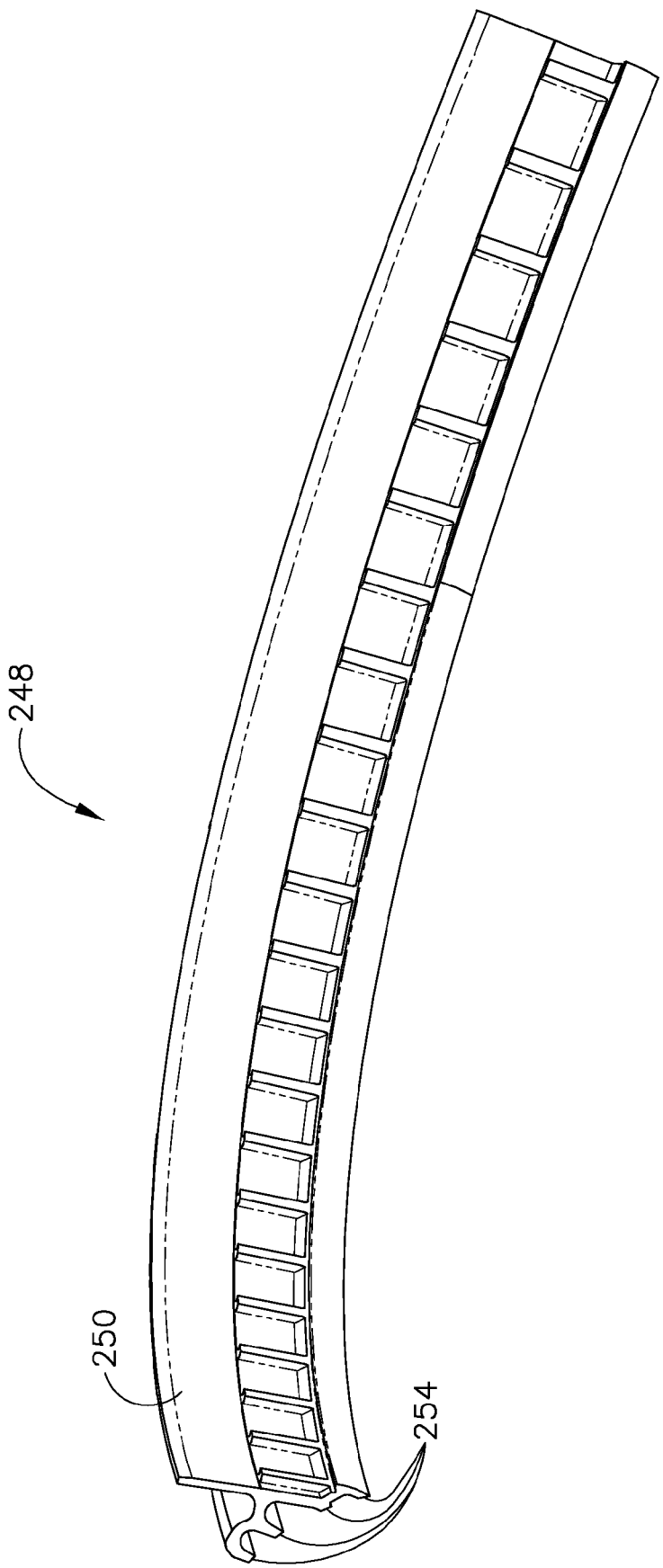
FIG. 14 is a bottom perspective view of the forward seal of FIG. 11.

Therefore, in addition to the baffle seals 50 described above, or as an alternative, an improved forward seal may be provided for the transcowl 26. FIGS. 9 and 10 illustrate an exemplary forward seal 148 which is carried at the forward end 49 of the inner wall 44, in place of the prior art forward seal 48. The forward seal 148 includes an arcuate front member 150 and an arcuate rear member 152. One or more spaced-apart, forward-facing inner seal teeth 154 extend forward from the front member 150. The rear member 152 includes a mounting flange 156 and a radially outwardly extending arm 158. One or more spaced-apart forward-facing outer seal teeth 160 extend from the arm 158. Both the front and rear members 150 and 152 may be constructed from any material rigid enough to hold its shape, such as metals, plastics, composites, synthetic rubber, or the like. The relative properties of the front and rear members 150 and 152 may be varied to suit their particular operating conditions. For example, the front member 150 may be made of metal or a rigid plastic to resist air loads while the rear member 152 may be made from a lighter material to save weight or provide resilience in case of accidental contact with the torque box 34. The inner and outer seal teeth 154 and 160 are shaped and sized so that each of their tips rides in close proximity to the torque box 34 when the transcowl 26 is stowed. For example, there may be a gap "G'" of about 2.5 mm (0.1 in.) between the torque box 34 and the tips. Collectively, the inner and outer seal teeth 154 and 160 define a labyrinth seal. A pressure drop occurs across each seal tooth and collectively the teeth present a tortuous flow path for air flow that resists leakage through the gap G' which in turn improves SFC. It is estimated that this leakage reduction can improve SFC by about 0.05% in certain applications. In the illustrated example, the forward seal 148 is retained to the inner wall 44 with bolts 162, but other types of fasteners or adhesives could be used as well.

Figure 15:
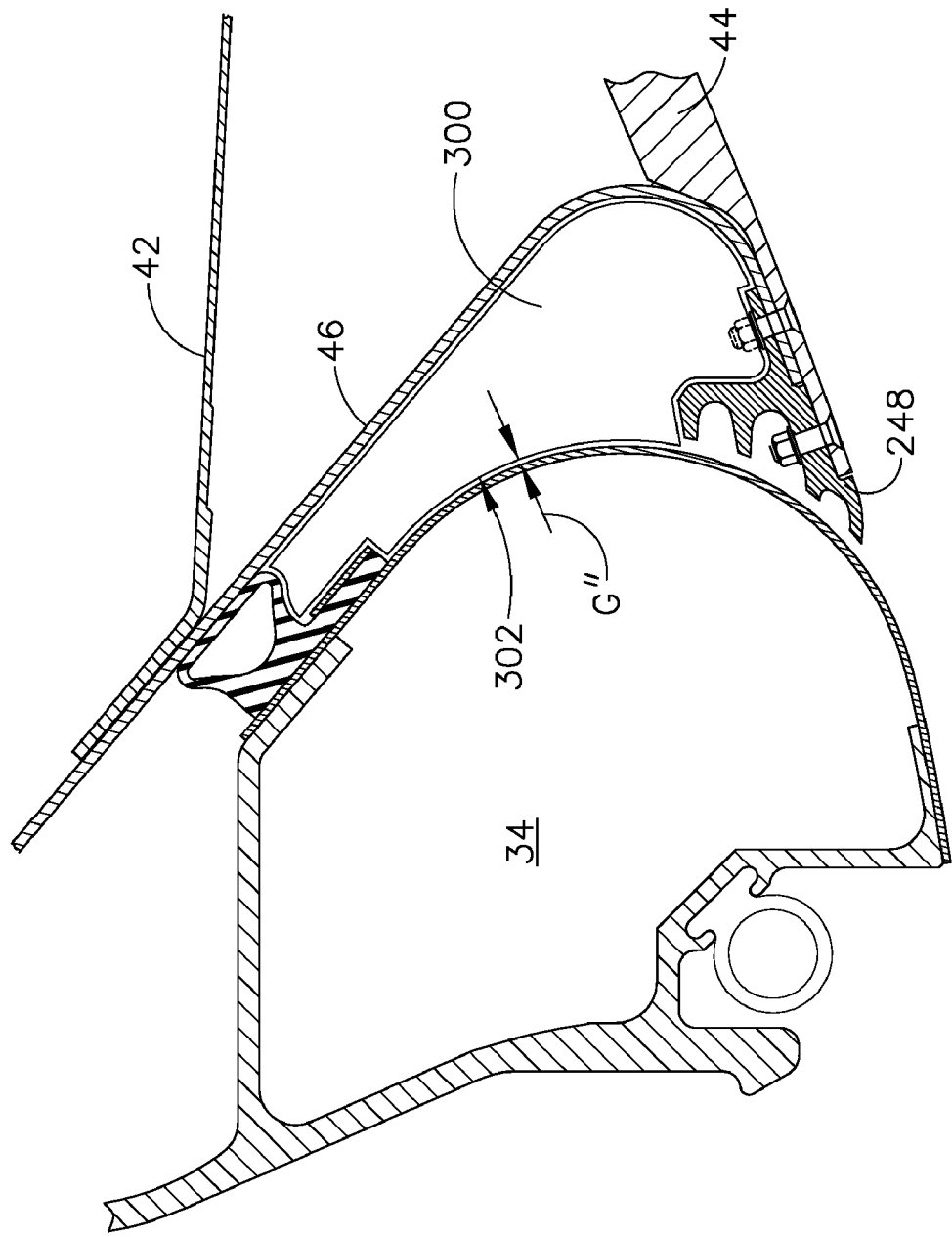
FIG. 15 is a cross-sectional view of a portion of a thrust reverser including a circumferential restrictor constructed according to another aspect of the present invention.

FIGS. 11-14 illustrate an alternative forward seal 248 for use with the transcowl 26. It includes an arcuate mounting flange 250 with a radial arm 252 having forward and aft faces 256 and 262. One or more spaced-apart forward-facing arcuate seal teeth 254 extend from the mounting flange 250, the forward face 256 of the radial arm 252, or both. A series of generally radially aligned forward stiffeners 258 (not shown in FIG. 11) are spaced along the circumference of the forward seal 248 and extend between the seal teeth 254. The forward stiffeners 258 serve to support the seal teeth 254 and also to block air flow in a circumferential direction along the forward seal 248, which further discourages leakage from the bypass duct 18. A series of generally radially extending rear stiffeners 260 are spaced apart along the circumferential length of the forward seal 248 and extend between the mounting flange 250 and the aft face 262 of the radial arm 252. Scallops 261 (best seen in FIG. 13) may be formed in the forward seal 248 to reduce its weight. Collectively, the seal teeth 254 define a labyrinth seal which resists leakage between the transcowl 26 and the torque box 34 as described above. The forward seal 248 may be constructed from any material rigid enough to hold its shape, such as metals, plastics, composites, synthetic rubber, or the like. It may be an integral one-piece plastic molding. In the illustrated example, the forward seal 248 is retained to the inner wall 44 with bolts 264, but other types of fasteners or adhesives could be used as well In addition to or as an alternative to any of the seals described above, the transcowl 26 may also include one or more circumferential restrictors 300 disposed within the interior of the baffle 46. FIG. 15 shows one such restrictor 300. Several such restrictors 300 may be spaced out along the arc length of the baffle 46. The restrictors 300 are attached to the baffle 46 and move with the transcowl 26. They may also be attached to the torque box 34, in which case they would remain fixed as the transcowl 26 moves. In operation, the restrictors 300 serve to prevent air flow in a circumferential direction within the interior of the baffle 46 and thus block or disrupt the leakage flow path described above.

FIGS. 16 and 17 show one of the restrictors 300 in more detail. The restrictor 300 is generally planar and may be constructed from any material rigid enough to maintain its shape in use, for example metal, plastic, composites, or synthetic rubber. In plan view the periphery of the restrictor 300 conforms to the shape of the baffle 46 and has an arcuate leading edge 302 which conforms to the aerostow seal 51, torque box 34 and forward seal 248 (if present), leaving a gap "G''''" of about 2.5 mm (0.1 in.) between the leading edge 302 of the restrictor 300 and the torque box 34 (or between the restrictor 300 and the baffle 46). The restrictor 300 also includes a mounting flange 304 which may be used to facilitate mounting the restrictor 300 to the baffle 46 or torque box 34 with rivets, screws, adhesives, or the like (not shown).

The foregoing has described sealing arrangements for a gas turbine engine thrust reverser. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A transcowl for a gas turbine engine thrust reverser, comprising:
    (a) an arcuate outer wall;
    (b) an arcuate inner wall;
    (c) an arcuate baffle disposed between the inner and outer walls at a forward end of the transcowl, the baffle having an arcuate cross-sectional shape which defines a forward-facing interior area; and (d) an arcuate forward seal carried at a forward end of the inner wall, the forward seal including a plurality of axially-extending, radially spaced-apart arcuate seal teeth which collectively define a labyrinth seal, wherein the forward seal comprises:
  (i) a mounting flange with at least one arcuate seal tooth extending axially therefrom; and
  (ii) a radially outwardly extending arm with at least one arcuate seal tooth extending axially from a forward face thereof.

2. the transcowl assembly of claim 1 wherein the forward seal includes at least one generally radially aligned forward stiffener extending between the seal teeth.

3. The transcowl assembly of claim 2 wherein a plurality of generally radially aligned forward stiffeners are spaced along the circumference of the forward seal.

4. The transcowl assembly of claim 3 further including a plurality of generally radially aligned rear stiffeners extending from the mounting flange to an aft face of the radial arm.

5. The transcowl assembly of claim 4 wherein the forward seal is a single integral unit.

6. A transcowl for a gas turbine engine thrust reverser, comprising:
  (a) an arcuate outer wall;
  (b) an arcuate inner wall;
  (c) an arcuate baffle disposed between the inner and outer walls at a forward end of the transcowl, the baffle having an arcuate cross-sectional shape which defines a forward-facing interior area;
  (d) an arcuate forward seal carried at a forward end of the inner wall, the forward seal including a plurality of axially-extending, radially spaced-apart arcuate seal teeth which collectively define a labyrinth seal; and
  (e) at least one restrictor disposed in the interior area so as to block air movement in a circumferential direction within the interior area.

7. A transcowl for a gas turbine engine thrust reverser, comprising:
  (a) an arcuate outer wall;
  (b) an arcuate inner wall; and
  (c) an arcuate baffle disposed between the inner and outer walls at a forward end of the transcowl, the baffle having an arcuate cross-sectional shape which defines a forward-facing interior area; and
  (d) at least one restrictor disposed in the interior area so as to block air movement in a circumferential direction within the interior area.

8. The transcowl of claim 7 wherein the restrictor has a perimeter shape which conforms to the shape of the baffle.

9. The transcowl of claim 8 wherein the restrictor has an arcuate leading edge.

10. The transcowl of claim 7 wherein the restrictor is generally planar and includes at least one mounting flange.

11. The transcowl of claim 7 wherein the restrictor is attached to the baffle.

\* \* \* \* \*